(12) United States Patent
Kajihara et al.

(10) Patent No.: US 7,925,313 B2
(45) Date of Patent: Apr. 12, 2011

(54) PORTABLE ELECTRONIC DEVICE

(75) Inventors: Sunao Kajihara, Hiroshima (JP); Kimiaki Imai, Hiroshima (JP); Satoshi Mizuno, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 601 days.

(21) Appl. No.: 12/030,349

(22) Filed: Feb. 13, 2008

(65) Prior Publication Data

US 2008/0242380 A1 Oct. 2, 2008

(30) Foreign Application Priority Data

Mar. 26, 2007 (JP) ................................. 2007-078230

(51) Int. Cl.
*H04M 1/00* (2006.01)
(52) U.S. Cl. ................ 455/575.1; 455/575.3; 455/575.4
(58) Field of Classification Search ............... 455/575.1, 455/575.3, 575.4
See application file for complete search history.

(56) References Cited

U.S. PATENT DOCUMENTS

| 7,159,833 | B2 * | 1/2007 | Kato ........................... 248/349.1 |
| 7,580,734 | B2 | 8/2009 | Ahn et al. |
| 7,636,591 | B2 * | 12/2009 | Kim et al. .................. 455/575.4 |
| 7,671,841 | B2 * | 3/2010 | Lee et al. ...................... 345/158 |
| 2004/0087353 | A1 * | 5/2004 | Satoh et al. ................ 455/575.3 |
| 2004/0137940 | A1 |  7/2004 | Matsunami |
| 2006/0154702 | A1 * | 7/2006 | Kang et al. ................. 455/575.3 |
| 2006/0172764 | A1 |  8/2006 | Makino |
| 2006/0225249 | A1 | 10/2006 | Cho |

FOREIGN PATENT DOCUMENTS

| CN | 1845560 A | 10/2006 |
| CN | 1933497 A |  3/2007 |
| JP | 8-63259 A |  3/1996 |
| JP | 2004-215180 A |  7/2004 |
| JP | 2004-289507 A | 10/2004 |
| JP | 2005-109971 A |  4/2005 |
| JP | 2005-294935 A | 10/2005 |
| JP | 2006-211576 A |  8/2006 |
| KR | 10-2006-0045505 A |  5/2006 |

* cited by examiner

*Primary Examiner* — Nick Corsaro
*Assistant Examiner* — Joel Ajayi
(74) *Attorney, Agent, or Firm* — Birch, Stewart, Kolasch & Birch, LLP

(57) ABSTRACT

A longitudinally-extending liquid crystal display part is provided at a front face of a first housing. A camera accommodation part is provided at an upper end of a second housing to bulge from a front face of the second housing and extend laterally, and an operating part is disposed in the second housing below the camera accommodation part. The first housing is supported by a cam mechanism (support mechanism) in the second housing changeably between a vertical position in which it is superposed on the second housing as viewed from the front face of the second housing and a horizontal position in which it lies orthogonal to the second housing to expose the operating part by turning the first housing on and along the front face of the second housing by means of the cam mechanism.

12 Claims, 6 Drawing Sheets

PORTABLE ELECTRONIC DEVICE

CROSS-REFERENCE TO RELATED APPLICATION

This application claims priority under 35 USC 119 to Japanese Patent Application No. 2007-78230 filed on Mar. 26, 2007, the entire contents of which are incorporated herein by reference.

BACKGROUND OF THE INVENTION (a) Field of the Invention

This invention relates to portable electronic devices with a display part and particularly relates to those in which a display part is supported changeably between a vertical position and a horizontal position.

(b) Description of the Related Art

An increasing number of portable electronic devices, especially mobile phones, have been having a TV receiving function in Japan owing in part to start of Integrated Service Digital Broadcasting-Terrestrial (ISDB-T) for portable electronic devices in this country.

The terrestrial digital television broadcasting, unlike conventional analog television broadcasting, can provide so-called bidirectional service including viewers' participation in quiz shows via TV sets and use of TV shopping or bank remittance via TV sets. When the terrestrial digital television broadcasting can be viewed on a mobile phone, this further increases the need for the user to operate keys on the operating part while viewing images on the display part. TV images are normally landscape. Therefore, in order that the user views TV images as large as possible on a small liquid crystal display part, the liquid crystal display part needs to be placed in a horizontal position.

To cope with this, for example, Published Japanese Patent Application No. 2004-215180 discloses a portable wireless electronic device whose body includes a first housing with a plurality of operation keys, a second housing with a display having a rectangular screen of predetermined aspect ratio and a connecting part connecting the first and second housings to each other and including a pivot mechanism for turning the second housing with respect to the first housing along a plane parallel with the screen. The second housing is configured to display images, during wireless communication, in a position in which the screen is vertically oriented and display images, during TV watching, in a position in which the screen is horizontally oriented.

Alternatively, Published Japanese Patent Application No. 2006-211576 discloses a portable electronic device in which a first housing having a display part is connected to a second housing having an operating part by a hinge to allow both the housings to be freely opened and closed in their folded form and the display part is guidedly supported by a cam mechanism so that one of its lower corners can move along the hinge upon position change between vertical and horizontal positions. Thus, the display part can be increased in size in spite of reduction of the entire electronic device size and can be easily changed between vertical and horizontal positions, and the user can easily operate the operating part while viewing the display part even in the horizontal position.

However, in the portable electronic device disclosed in Published Japanese Patent Application No. 2004-215180, the operation from during non-use to during TV watching is a cumbersome operation of first opening the second housing, turning it from vertical to horizontal position and then sliding it.

On the other hand, in the portable electronic device disclosed in Published Japanese Patent Application No. 2006-211576, the operation from during non-use to during TV watching is a simple operation of opening the first housing and turning it from vertical to horizontal position. However, since the portable electronic device has a structure in which the three housings composed of the display part, the first housing supporting the display part and the second housing are connected, there is a definite limit to reducing the entire thickness of the electronic device.

SUMMARY OF THE INVENTION

The present invention has been made in view of the foregoing points and, therefore, an object of the present invention is to provide a portable electronic device having a display part in which the display part can be easily changed between vertical and horizontal positions and concurrently the entire thickness can be reduced.

To attain the above object, a first aspect of the invention is a portable electronic device including: a first housing having a longitudinally-extending display part provided at a front face thereof; and a second housing including a camera accommodation part provided at an upper end thereof to bulge from a front face thereof and an operating part disposed below the camera accommodation part, wherein the first housing is supported by a support mechanism in the second housing changeably between a vertical position in which the first housing is superposed on the second housing as viewed from the front face of the second housing and a horizontal position in which the first housing lies orthogonal to the second housing by turning the first housing on and along the front face of the second housing by means of the support mechanism, and the support mechanism comprises a cam mechanism.

According to the above configuration, since the first housing is changed to the vertical or horizontal position by turning it on and along the front face of the second housing and the operating part is thereby exposed, the user can view the display part in the horizontal position with the operating part in a normal orientation and in a state capable of keying. Therefore, the user can very easily operate the portable electronic device also in using bidirectional services such as TV shopping. Furthermore, since the support mechanism is provided in the second housing, the entire thickness of the portable electronic device is restricted only by the thicknesses of the first and second housings, which enables the reduction of the entire thickness.

A second aspect of the invention is the portable electronic device according to the first aspect of the invention, wherein a camera having an optical zoom function is accommodated in the camera accommodation part.

Generally, a camera having an optical zoom function is less deteriorated in image quality than that having a digital zoom function but accordingly requires a sufficient height to place it in the electronic device. According to the configuration of the second aspect of the invention, since the operating part of the second housing, the first housing and the support mechanism supporting the first housing can be provided within the height of the camera accommodation part, the space required for the camera can be effectively used.

A third aspect of the invention is the portable electronic device according to the first or second aspect of the invention, wherein the cam mechanism is configured so that when the first housing is changed to the vertical or horizontal position, one of the upper corners of the first housing moves substantially in parallel to the camera accommodation part.

According to the above configuration, since the first housing is changed to the vertical or horizontal position to avoid contact with the camera accommodation part, this eliminates the need to round the corners of the first housing, thereby increasing the display size.

A fourth aspect of the invention is the portable electronic device according to any one of the first to third aspects of the invention, wherein the lateral middle of the first housing in the horizontal position is located substantially in the lateral middle of the second housing.

According to the above configuration, the first housing is disposed sightly with respect to the second housing and well-balanced when the user holds the second housing.

A fifth aspect of the invention is the portable electronic device according to any one of the first to fourth aspects of the invention, wherein the cam mechanism includes: a curved first guide groove formed in the second housing to laterally extend and bend in a downcurved shape; a second guide groove formed in the second housing below the first guide groove; a first guide pin provided on the back face of the first housing to slidably engage into the first guide groove; and a second guide pin provided on the back face of the first housing to slidably engage into the second guide groove.

According to the above configuration, with a simple and compact structure, the first housing can be changed to the vertical or horizontal position without contact with the camera accommodation part. This provides a compact and user-friendly portable electronic device. Furthermore, since the first housing is prevented from contact with the camera accommodation part by the action of the cam mechanism, this eliminates the need to round the corners of the first housing, thereby increasing the display size.

A sixth aspect of the invention is the portable electronic device according to the fifth aspect of the invention, wherein the first and second guide pins are connected by a link member, and the link member is attached to the back face of the first housing.

According to the above configuration, since the first and second guide pins and the first and second guide grooves can be arranged in a unit, this extremely facilitates the assembly work. Furthermore, the link member operatively connects the first guide pin to the second guide pin, whereby the first housing can be stably turned and the first and second guide pins can be easily positioned.

A seventh aspect of the invention is the portable electronic device according to the sixth aspect of the invention, wherein the cam mechanism includes a resilient member for urging the first housing into at least the vertical position or the horizontal position, the resilient member being fitted at one end thereof to the first guide pin and fitted at the other end to the second housing.

According to the above configuration, the change of the display part from the vertical to horizontal position, the change thereof from the horizontal to vertical position or the change thereof between the vertical and horizontal positions is assisted by the resilient member depending upon set-up of how the resilient member urges the display part.

An eighth aspect of the invention is the portable electronic device according to the seventh aspect of the invention, wherein the resilient member comprises a torsion coil spring.

According to the above configuration, a nonbreakable, low-priced resilient member is provided.

A ninth aspect of the invention is the portable electronic device according to the eighth aspect of the invention, wherein the first and second guide grooves are formed in a pressed guide plate, the torsion coil spring and the link member are assembled with the guide plate into a unit and the unit is attached to the second housing.

According to the above configuration, since the torsion coil spring and the link member are assembled into the second housing after they are assembled in a unit with the guide plate, a compact, high-assemblability cam mechanism can be provided.

A tenth aspect of the invention is the portable electronic device according to any one of the fifth to ninth aspects of the invention, wherein the second guide groove extends vertically while inclining to the right or left. Furthermore, an eleventh aspect of the invention is the portable electronic device according to any one of the fifth to ninth aspects of the invention, wherein the second guide groove extends vertically while curving.

According to these aspects of the invention, an appropriate behavior of the first housing can be provided by adjusting the shape of the first guide groove according to the shape of the second guide groove.

A twelfth aspect of the invention is the portable electronic device according to any one of the first to eleventh aspects of the invention, wherein the portable electronic device is a mobile phone.

According to the above configuration, there is provided a thin mobile phone whose display part is changeable to the vertical or horizontal position with a simple operation.

As described so far, according to the present invention, since the first housing is changeable to the vertical or horizontal position on and along the front face of the second housing including the camera accommodation part, this concurrently provides ease of change of the display part from the vertical to horizontal position and reduction of the entire thickness of the portable electronic device.

DETAILED DESCRIPTION OF THE INVENTION

A description is given below of an embodiment of the present invention with reference to the drawings.

Figure 1:
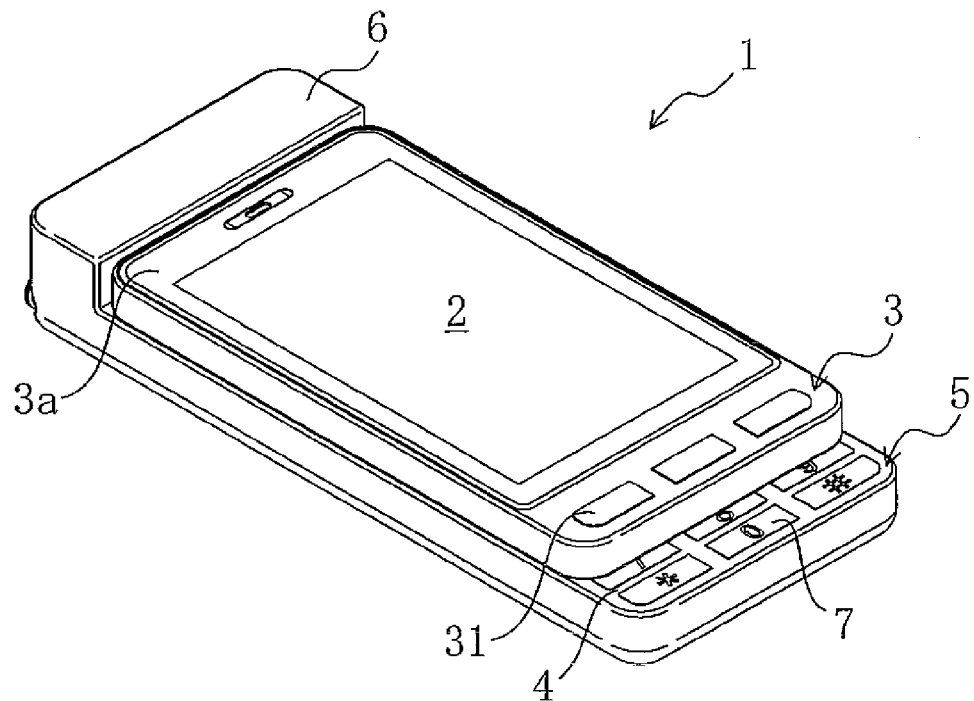
FIG. 1 is a perspective view of a mobile phone according to an embodiment of the present invention as viewed from the front when a first housing is in a vertical position.

FIG. 1 is a perspective view of a vertically oriented mobile phone according to an embodiment of the present invention as viewed from the front.

Figure 2:
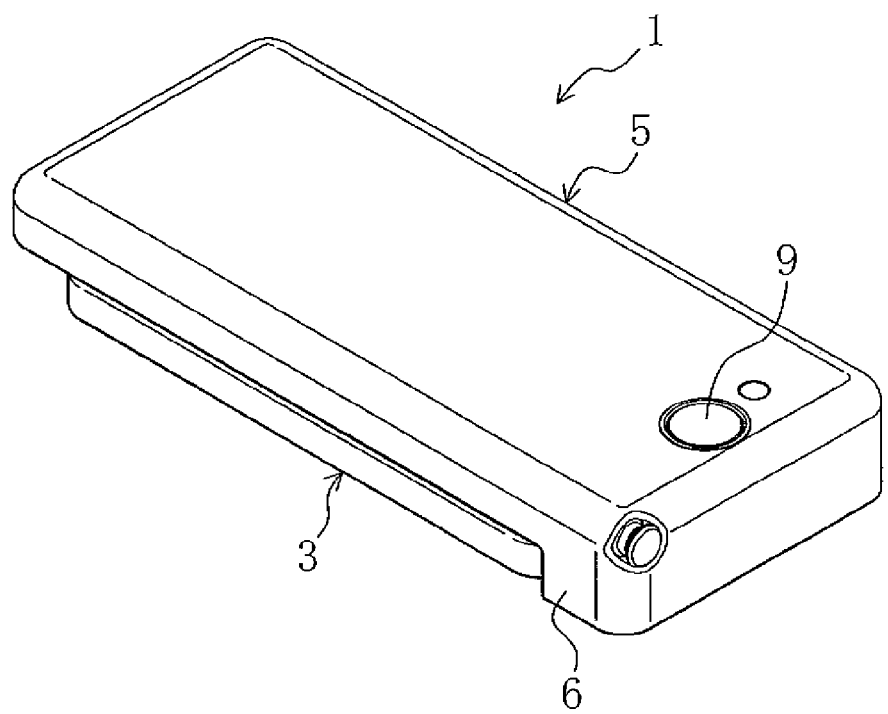
FIG. 2 is a perspective view of the mobile phone according to the embodiment of the present invention as viewed from the back when the first housing is in the vertical position.

FIG. 2 is a perspective view of the vertically oriented mobile phone as viewed from the back.

The mobile phone 1, which is a portable electronic device according to the present invention, includes a first housing 3 having a longitudinally-extending liquid crystal display part 2 provided at a front face thereof and a second housing 5 including a camera accommodation part 6 of rectangular parallelepiped provided at an upper end thereof to bulge from a front face thereof and an operating part 4 disposed below the camera accommodation part 6.

Figure 3:
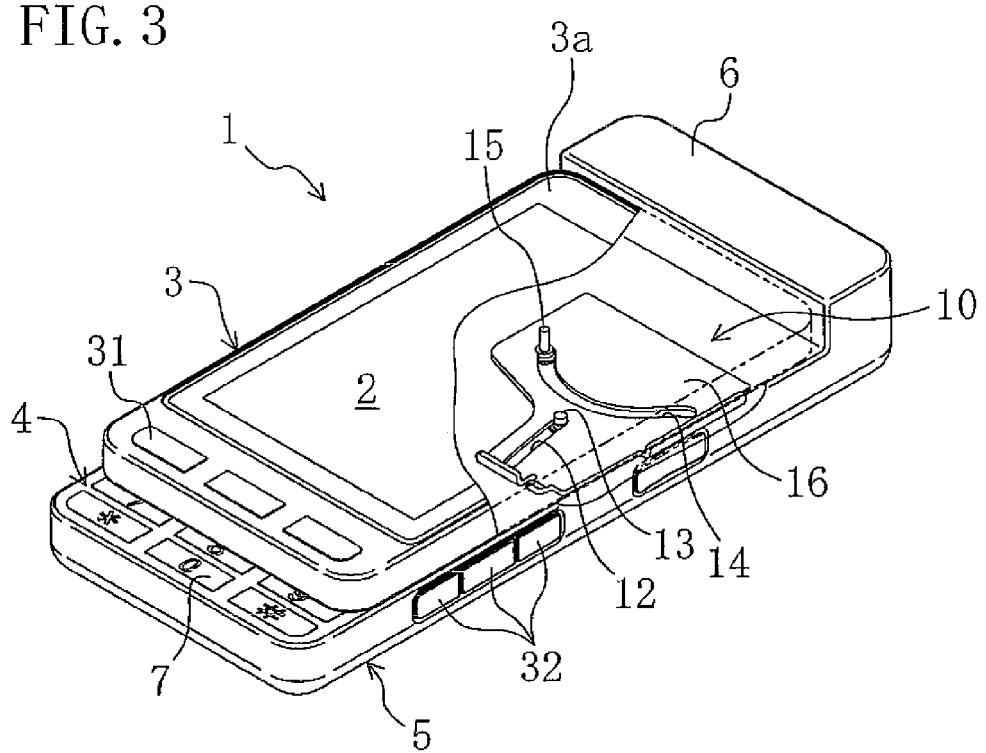
FIG. 3 is a partly-cutaway perspective view of the mobile phone when the first housing is in the vertical position.
Figure 4:
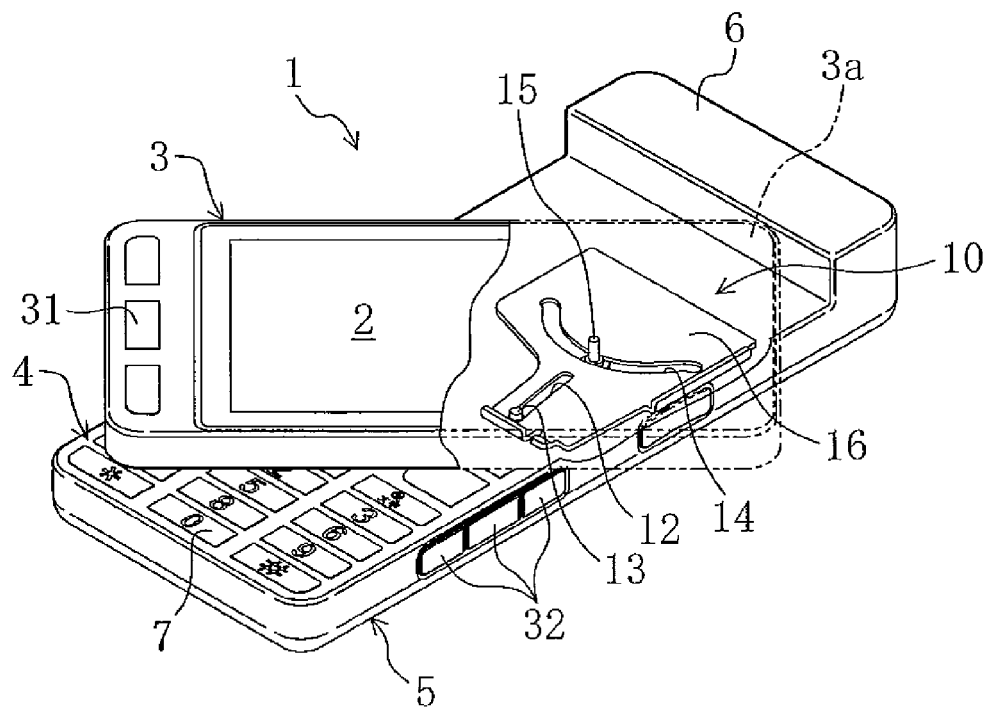
FIG. 4 is a corresponding view of FIG. 3, illustrating when the first housing is being changed from the vertical position to the horizontal position.
Figure 5:
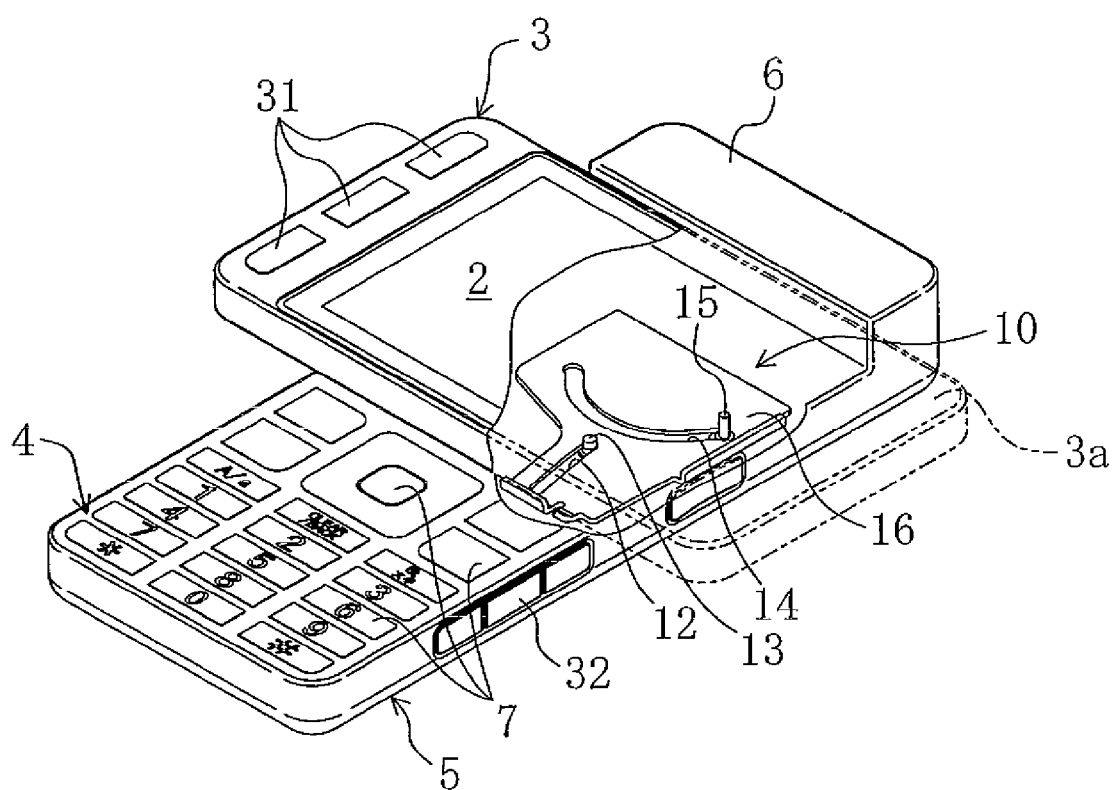
FIG. 5 is a corresponding view of FIG. 3, illustrating when the first housing is in a horizontal position.

FIGS. 3 to 5 show a cam mechanism 10 serving as a support mechanism for supporting the first housing upon change in position, wherein the first and second housings 3 and 5 are partly cut away. The cam mechanism 10 is used for supporting the first housing 3 to the second housing 5 to allow the first housing 3 to change between vertical and horizontal positions. Specifically, the first housing 3 in the shape of a substantially rectangular plate is supported to the second housing 5 changeably between a vertical position in which it is superposed on the second housing 5 as viewed from the front face of the second housing 5 (see FIG. 1) and a horizontal position in which it lies orthogonal to the second housing 5 (see FIG. 5) by turning it on and along the front face of the second housing 5.

The cam mechanism 10 is disposed in the second housing 5 below the camera accommodation part 6, while the operating part 4 is disposed in the second housing 5 below the cam mechanism 10. In other words, the cam mechanism 10 and the operating part 4 are disposed to vertically shift from each other. Therefore, the space can be effectively used to restrain the entire thickness of the mobile phone 1. The operating part 4 is provided with a plurality of operation keys 7. These operation keys 7 are arranged to allow key-in when the user holds the second housing 5 in a vertical orientation with the first housing 3 in the horizontal position and have marks put on their surfaces. Through the operation of these operation keys 7, the user can be offered various functions of the mobile phone 1. Furthermore, three function buttons 31, for example, are disposed below the liquid crystal display part 2 of the first housing 3. The function buttons 31 include a call history list button and an incoming call history list button.

According to this mobile phone 1, when the first housing 3 is in the horizontal position, the user can operate the operation keys 7 of the operating part 4 while looking at the horizontally-oriented liquid crystal display part 2. Furthermore, the user operates the function buttons 31 while holding the rectangular mobile phone 1 with its longitudinal side vertically oriented or horizontally oriented. As shown in FIG. 5, the lateral middle of the first housing 3 in the horizontal position is located substantially in the lateral middle of the second housing 5. Therefore, the first housing 3 is disposed sightly with respect to the second housing 5 and well-balanced when the user holds the second housing 5.

The camera accommodation part 6 is disposed to laterally extend at the upper end of the second housing 5 and its lower end face laterally linearly extends. The camera accommodation part 6 contains a camera 9 (shown in FIG. 2 only) having an optical zoom function. Generally, a camera having an optical zoom function is less deteriorated in image quality than that having a digital zoom function but accordingly requires a sufficient height (thickness) to place it in the mobile phone 1. However, since in this embodiment the operating part 4 of the second housing 5, the first housing 3 and the cam mechanism 10 supporting the first housing 3 are disposed within the height of the camera accommodation part 6, the space required for the camera 9 is effectively used. The second housing 5 is also provided at its side face with camera buttons 32 for operating the camera 9.

The upper end of the first housing 3 in the vertical position can be formed linearly owing to the cam mechanism 10, whereby the liquid crystal display part 2 can be formed in a rectangular shape to occupy most of the front face of the first housing 3. The corners of the first housing 3 including upper corners 3a are rounded in consideration of design or safety.

Figure 6:
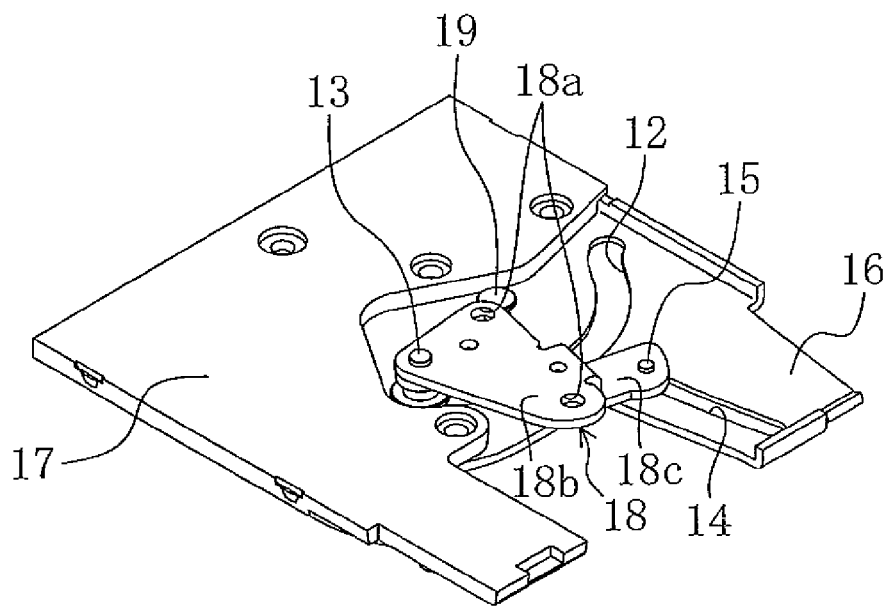
FIG. 6 is a perspective view of a cam mechanism and a magnesium frame as viewed from the front of the mobile phone when the first housing is in the vertical position.
Figure 7:
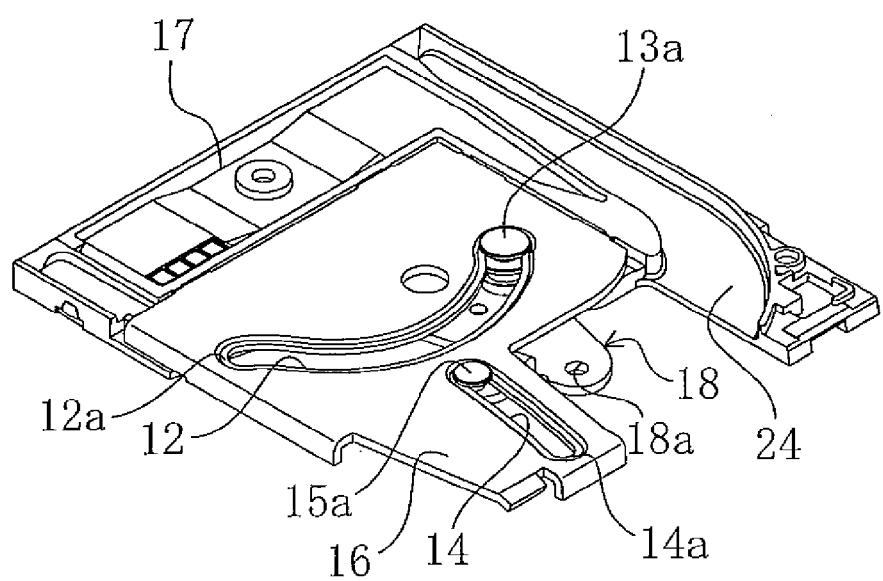
FIG. 7 is a perspective view of the cam mechanism and the magnesium frame as viewed from the back of the mobile phone when the first housing is in the vertical position.
Figure 8:
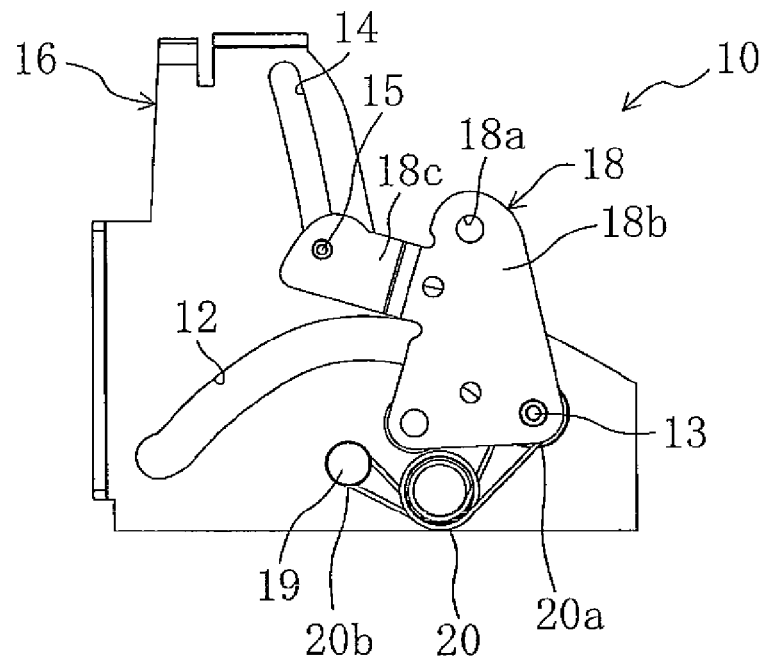
FIG. 8 is a front view showing the cam mechanism when the first housing is in the vertical position.

FIGS. 6 and 7 show the cam mechanism 10 and a magnesium frame 17 when the first housing 3 is in the vertical position. The second housing 5 includes the magnesium frame 17 for reinforcement and a guide plate 16 connected to the magnesium frame 17. The guide plate 16 is made of sheet metal of, for example, stainless steel. The magnesium frame 17 may be made of a metal formed part or made of a pressed part.

The cam mechanism 10 includes a laterally-extending, curved first guide groove 12 formed in the second housing 5 to bend in a downcurved shape, a vertically-extending, linear second guide groove 14 formed in the second housing 5, a first guide pin 13 provided on the back face of the first housing 3 to slidably engage into the first guide groove 12, and a second guide pin 15 provided on the back face of the first housing 3 to slidably engage into the second guide groove 14.

Specifically, the first and second guide grooves 12 and 14 are formed in the guide plate 16. The first guide groove 12 is formed by the peripheral edge of a curved opening bending in a downcurved shape and its center is located at an upper right part of the first housing 3 as the mobile phone 1 is viewed from the front. The second guide groove 14 is formed by the peripheral edge of a linear opening disposed below the lowermost point of the downcurved shape of the first guide groove 12 to incline to the right relative to the lower end face of the camera accommodation part 6. The peripheral edges of the openings of both the guide grooves 12 and 14 have their respective steps 12a and 14a formed on the opposite side to the first housing 3 and depressed from the surface of the guide plate 16. The guide plate 16 is fixed to the magnesium frame 17 to lie at the front face of the second housing 5, such as by inserting screws (not shown) into through holes (not shown) in the guide plate 6 and fastening them.

On the other hand, the back face of the first housing 3 has a metal link member 18 fitted thereon. The link member 18 includes a plate-shaped mounting part 18b formed with through holes 18a for fastening or positioning the link member 18 to the back face of the first housing 3, and an extension 18c continued from the mounting part 18b to form the letter L in side view as the whole shape of the link member 18. The first guide pin 13 is provided at one end of the link member 18, more specifically, at one end of the mounting part 18b, to vertically extend towards the first housing 3. The second guide pin 15 is provided at the other end of the link member 18, more specifically, at the end of the extension 18c, to vertically extend towards the first housing 3. The guide pins 13 and 15 have their respective circular discs 13a and 15a formed at their distal ends. The circular discs 13a and 15a are configured to slide on the steps 12a and 14a, respectively. Thus, the guide pins 13 and 15 are prevented from dropping out of the guide grooves 12 and 14, respectively, and in turn the first housing 3 can be prevented from being detached from the second housing 5. Furthermore, the link member 18 operatively connects the first guide pin 13 to the second guide pin 15, whereby the first housing 3 can be stably turned and the first and second guide pins 13 and 15 can be easily positioned.

Figure 9:
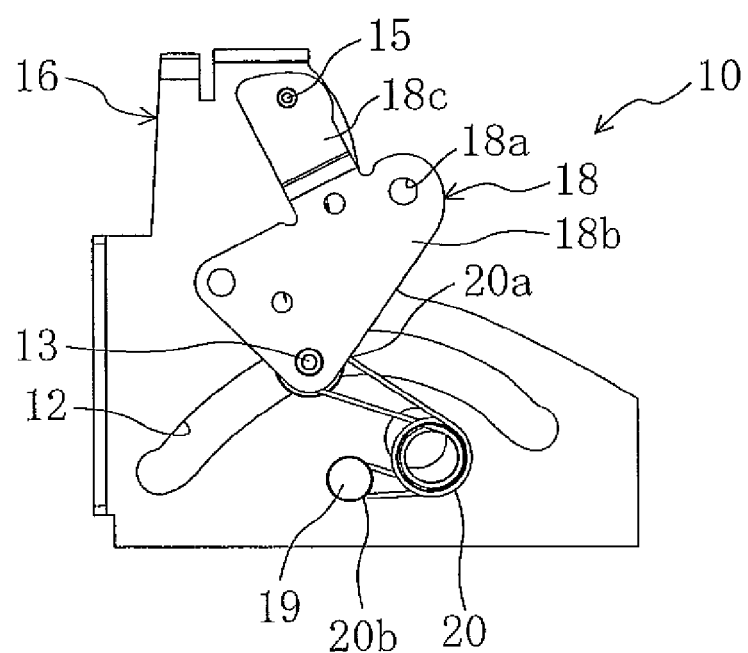
FIG. 9 is a corresponding view of FIG. 8, illustrating the cam mechanism after being turned about 45 degrees from the vertical position.
Figure 10:
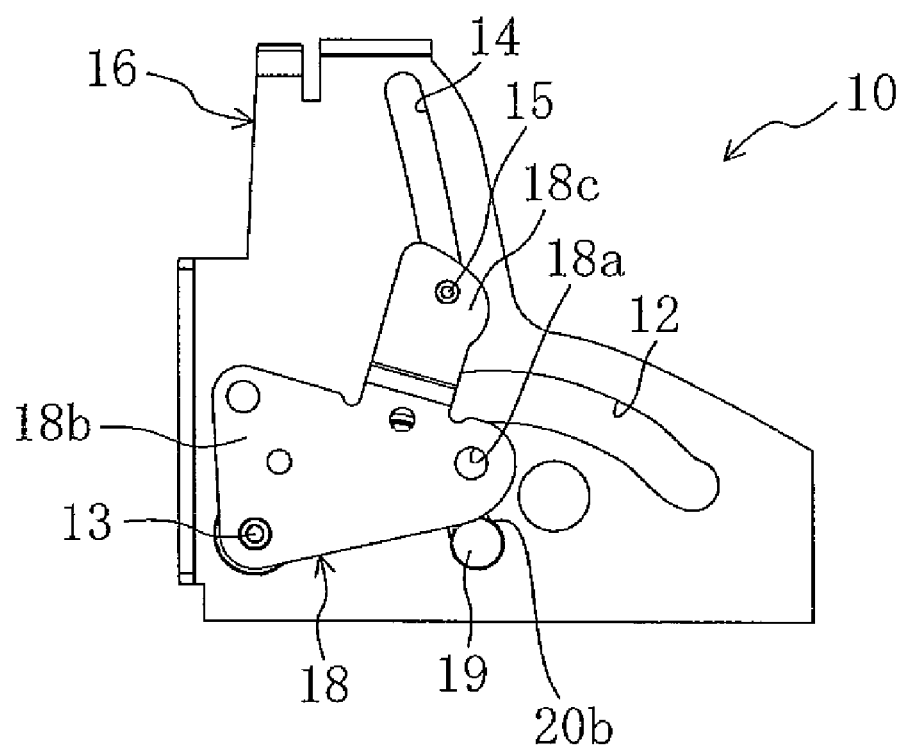
FIG. 10 is a corresponding view of FIG. 8, illustrating the cam mechanism when the first housing is in the horizontal position.

The top face of the guide plate 16 is provided with a spring retaining pin 19 vertically extending towards the first housing 3. A torsion coil spring 20 is retained as a resilient member on the spring retaining pin 19. Both ends 20a and 20b of the torsion coil spring 20 are formed in a substantially ring shape. The one end 20a is rotatably seated on the outer periphery of the first guide pin 13 spanning the space between the mounting part 18b and the guide plate 16, while the other end 20b is rotatably seated on the outer periphery of the spring retaining pin 19. Thus, the torsion coil spring 20 is supported on the spring retaining pin 19 to laterally swing about the spring retaining pin 19. Furthermore, the torsion coil spring 20 is placed so that its resilient force urges the first housing 3 to change from the vertical to horizontal position and change from the horizontal to vertical position. Specifically, the torsion coil spring 20 is placed to have the maximum flexure angle and be most compressed in the vicinity of the point where the first guide pin 13 is located closest to the spring retaining pin 19 as shown in FIG. 9 (where the second guide pin 15 is located at the upper end of the second guide groove 14). When the first guide pin 13 moves to the left or right from the closest point to the spring retaining pin 19, the torsion coil spring 20 urges the first housing 3 into the vertical position or the horizontal position.

The first and second guide pins 13 and 15, the first and second guide grooves 12 and 14, the torsion coil spring 20 and the link member 18 are formed to be capable of assembly in a unit. This extremely facilitates the assembly work and downsizes the mobile phone 1.

Although not shown in detail, a signal line electrically connecting the first housing 3 to the second housing 5 is connected at one end thereof to a liquid crystal substrate on the back of the liquid crystal display part 2. The other end of the signal line passes through the vicinity of the link member 18 and is then connected to a main substrate in the second housing 5. The intermediate part of the signal line is accommodated in a signal line routing recess 24 (see FIG. 7) formed in a surface of the magnesium frame 17 to avoid that it obstructs the movement of the cam mechanism 10 also when the first housing 3 is changed to the vertical or horizontal position.

By the action of the cam mechanism 10, the first housing 3 can be changed from the vertical to horizontal position while the upper left corner 3a is kept a certain distance away from the lower end face of the camera accommodation part 6 and a slight clearance is created between the left side face of the first housing 3 and the lower end face of the accommodation part 6.

Operations

Next, a description is given of operations of the mobile phone 1 according to this embodiment.

First, on standby as shown in FIG. 1, the first housing 3 is in a vertical position in which it is superposed on the second housing 5 in a space-saving relation. In this state, the operation keys 7 are under the first housing 3. The user makes a normal telephone call, in this vertical position, using the function buttons 31. On the other hand, when the user needs to enter a new telephone number, he or she changes the first housing 3 from the vertical position to a horizontal position as shown in FIG. 4 and, thus, can touch keys on the operating part 4. After entering the telephone number using the operation keys 7, the user changes the first housing 3 back to the vertical position and starts a call.

In using the TV function, the user can view the screen with the mobile phone 1 in his hands so that its longitudinal side is laterally oriented. On the other hand, in using bidirectional services such as TV shopping, the TV function is needed to be used with the operating part 4 put in a usable position. Therefore, the user changes the first housing 3 from the vertical to horizontal position and watches the program as by pushing a TV function button.

In using the camera 9, with the mobile phone 1 in the position shown in FIG. 1, the user activates the camera 9 with the camera button 32 disposed on the side face of the second housing 5, directs the camera 9 to the object and takes a picture by operating the camera button 32 while checking the picture composition on the liquid crystal display part 2.

As described above, in using the functions of the mobile phone 1, the user is in some cases required to change the first housing 3 to the vertical or horizontal position. In such cases, the user can change the first housing 3 to the vertical or horizontal position by turning it on and along the front face of the second housing 5. Since the change of the first housing 3 from the vertical to horizontal position or from the horizontal to vertical position is assisted by the torsion coil spring 20 provided in the cam mechanism 10, the user can extremely easily carry out the position change of the first housing 3 with one hand, Effects of Embodiment According to the mobile phone 1 of this embodiment, since the first housing 3 is changeable to the vertical or horizontal position on and along the front face of the second housing 5 including the camera accommodation part 6, this concurrently provides ease of change of the liquid crystal display part 2 from the vertical to horizontal position and reduction of the entire thickness of the mobile phone 1.

Furthermore, since in changing the position the first housing 3 is changed to the vertical or horizontal position to avoid contact with the camera accommodation part 6, this eliminates the need to round the corners of the first housing 3, thereby increasing the liquid crystal display part 2 in size.

Furthermore, since the cam mechanism 10 is provided in the second housing 5, the entire thickness of the mobile phone 1 is restricted only by the thicknesses of the first and second housings 3 and 5, which enables the reduction of the entire thickness.

Furthermore, with a simple and compact structure, the first housing 3 can be changed to the vertical or horizontal position without contact with the camera accommodation part 6 by the cam mechanism 10. This provides a compact and user-friendly mobile phone 1.

Other Embodiments

The above embodiment of the present invention may have the following configurations.

Although in the above embodiment the second guide groove 14 extends vertically while inclining to the right, it may extend vertically linearly or extend vertically while curving. In these cases, the shape of the first guide groove 12 is adjusted according to the shape of the second guide groove 14, whereby an appropriate behavior of the first housing 3 can be provided.

Although in the above embodiment the portable electronic device is a mobile phone, it may be a PC, mobile tool, electronic dictionary, electronic calculator, copy camera or any other portable electronic device. Furthermore, the portable electronic device of the present invention may be a portable communications device such as PHS or PDA.

Although in the above embodiment the first housing 3 includes a liquid crystal display part 2, it may include an organic EL display instead. The organic EL display needs little electricity to work because of self-emission of light, has a wider angle of visibility than the liquid crystal display and can be reduced in thickness because of no need for backlighting.

The above embodiments are merely illustrative in nature and are not intended to limit the scope, applications and use of the invention.

What is claimed is:

1. A portable electronic device, comprising:
a first housing having a longitudinally-extending display part provided at a front face thereof; and
a second housing including a camera accommodation part provided at an upper end thereof to bulge from a front face thereof and extend laterally and an operating part disposed below the camera accommodation part, wherein
the first housing is supported by a support mechanism in the second housing changeably between a vertical position in which the first housing is superposed on the second housing as viewed from the front face of the second housing and a horizontal position in which the first housing lies orthogonal to the second housing to expose the operating part by turning the first housing on and along the front face of the second housing by means of the support mechanism, and
the support mechanism comprises a cam mechanism includes,
a first guide groove formed in the second housing and extends in a lateral direction;
a second guide groove, provided independently from the first guide groove, and formed in the second housing below the first guide groove;
a first guide pin provided on the back face of the first housing to slidably engage into the first guide groove; and
a second guide pin provided on the back face of the first housing to slidably engage into the second guide groove.

2. The portable electronic device of claim 1, wherein a camera having an optical zoom function is accommodated in the camera accommodation part.

3. The portable electronic device of claim 1, wherein the cam mechanism is configured so that when the first housing is changed to the vertical or horizontal position, one of the upper corners of the first housing moves substantially in parallel to the laterally-extending lower end face of the camera accommodation part.

4. The portable electronic device of claim 1, wherein the lateral middle of the first housing in the horizontal position is located substantially in the lateral middle of the second housing.

5. The portable electronic device of claim 1, wherein the first guide groove is a curved guide groove bent in a down-curved shape.

6. The, portable electronic device of claim 5, wherein the first and second guide pins are connected by a link member, and the link member is attached to the back face of the first housing.

7. The portable electronic device of claim 6, wherein the cam mechanism includes a resilient member for urging the first housing into at least the vertical position or the horizontal position, the resilient member being fitted at one end thereof to the first guide pin and fitted at the other end to the second housing.

8. The portable electronic device of claim 7, wherein the resilient member comprises a torsion coil spring.

9. The portable electronic device of claim 8, wherein the first and second guide grooves are formed in a pressed guide plate, the torsion coil spring and the link member are assembled with the, guide plate into a unit and the unit is attached to the second housing.

10. The portable electronic device of claim 5, wherein the second guide groove extends vertically while inclining to the right or left.

11. The portable electronic device of claim 5, wherein the second guide groove extends vertically while curving.

12. The portable electronic device of claim 1, wherein the portable electronic device is a mobile phone.

* * * * *